(12) United States Patent
Yasuda et al.

(10) Patent No.: US 7,987,567 B2
(45) Date of Patent: Aug. 2, 2011

(54) MACHINE TOOL

(75) Inventors: Hiroshi Yasuda, Nara (JP); Hiroshi Hashimoto, Nara (JP)

(73) Assignee: Mori Seiki Co., Ltd., Yamatokoriyama-shi (KR)

( * ) Notice: Subject to any disclaimer, the term of this patent is extended or adjusted under 35 U.S.C. 154(b) by 450 days.

(21) Appl. No.: 12/265,138

(22) Filed: Nov. 5, 2008

(65) Prior Publication Data

US 2009/0121113 A1 May 14, 2009

(30) Foreign Application Priority Data

Nov. 8, 2007 (JP) ................... 2007-290427

(51) Int. Cl.
 *B23P 23/00* (2006.01)
 *B23B 3/00* (2006.01)
(52) U.S. Cl. .......................... 29/27 C; 82/121
(58) Field of Classification Search .............. 82/117, 82/121, 123, 149; 29/27 C, 27 R
 See application file for complete search history.

(56) References Cited

U.S. PATENT DOCUMENTS

| | | | | |
|---|---|---|---|---|
| 2,390,933 | A * | 12/1945 | Fuglie ........................ | 451/285 |
| 3,925,877 | A * | 12/1975 | Junike et al. ............... | 483/7 |
| 4,545,271 | A | 10/1985 | Romi .......................... | 82/32 |
| 5,127,140 | A | 7/1992 | Oiwa et al. ................. | 29/27 |
| 7,039,992 | B2 * | 5/2006 | Tokuma et al. ............. | 29/27 C |
| 7,266,871 | B2 * | 9/2007 | Takeuchi et al. ........... | 29/27 C |

FOREIGN PATENT DOCUMENTS

| | | |
|---|---|---|
| DE | 10 2006 013766 A1 | 9/2006 |
| EP | 1 160 052 A1 | 12/2001 |
| EP | 1 402 994 A2 | 3/2004 |
| EP | 1 495 833 A2 | 1/2005 |
| JP | 2003-225806 | 8/2003 |
| JP | 2003-311565 | 11/2003 |
| JP | 2003-311565 A1 | 11/2003 |
| JP | 2006-263861 A1 | 10/2006 |

OTHER PUBLICATIONS

European Search Report dated Mar. 26, 2009.

* cited by examiner

*Primary Examiner* — Will Fridie, Jr.
(74) *Attorney, Agent, or Firm* — Kratz, Quintos & Hanson, LLP

(57) ABSTRACT

A machine tool has a pair of guide rails and a pair of upper and lower ball screws. No forces are transferred between a beam of a double column frame and a movable unit. The guide rails are spaced from each other and disposed on a bed, and the movable unit is horizontally movably supported on the guide rails. The upper and lower ball screws are mounted respectively on upper and lower portions of the double column frame for moving the movable unit horizontally. Even when the beam is deformed by flexing downwardly by gravity, the movable unit moves stably and smoothly at a high speed to machine a workpiece highly accurately without being adversely affected by the deformation of the beam.

10 Claims, 9 Drawing Sheets

MACHINE TOOL

BACKGROUND OF THE INVENTION

1. Field of the Invention

The present invention relates to a machine tool including a double column frame extending horizontally from side to side as viewed in front elevation and a movable unit having a tool rest and movable horizontally from side to side along the double column frame.

2. Description of the Related Art

Japanese laid-open patent publication No. 2006-263861 discloses a machine tool including a double column frame extending from side to side as viewed in front elevation and a movable unit having a tool rest and movable from side to side along the double column frame. The double column frame comprises a pair of horizontally spaced columns, an upper beam interconnecting the upper ends of the columns, and a lower beam interconnecting the lower ends of the columns. The double column frame can be manufactured as an integral casting as it has a small horizontal length.

The upper and lower beams have respective upper and lower guide rails. The movable unit is supported and guided by the upper and lower guide rails for horizontal movement from side to side along the double column frame.

A machine tool disclosed in Japanese laid-open patent publication No. 2003-311565 includes a movable unit having a tool rest and movable from side to side in the X-axis directions shown in Japanese laid-open patent publication No. 2003-311565. The movable unit is supported and guided by a pair of guide rails mounted on a bed and is movable from side to side by a ball screw mounted on the bed.

The double column frame of the machine tool disclosed in Japanese laid-open patent publication No. 2006-263861 can be manufactured as an integral casting as it has a small horizontal length. Since an upper beam of the double column frame is part of the integral casting, the upper beam is almost free of the tendency to flex downwardly by gravity. As a result, the upper guide rail is essentially free from deformations, allowing the tool rest of the movable unit to machine the workpiece highly accurately.

If, however, the double column frame is of a horizontally elongate shape and is made of steel, then the horizontally extending upper beam tends to flex downwardly by gravity. The upper guide rail is also liable to flex downwardly, and the movable unit as it moves horizontally is adversely affected by the deformation of the upper guide rail. As a result, it is difficult to move the movable unit stably and smoothly at a high speed from side to side, and the accuracy with which the tool rest machines the workpiece is lowered.

The movable unit of the machine tool disclosed in Japanese laid-open patent publication No. 2003-311565 is moved from side to side on the bed. The machine tool has no double column frame. As the ball screw is mounted on the bed, the ball screw applies horizontal forces to only a lower portion of the movable unit. No ball screw is mounted on an upper portion of the movable unit.

Consequently, since forces applied from the ball screw to the movable unit to move from side to side are localized on the movable unit, it is difficult to move the movable unit stably and smoothly at a high speed from side to side.

SUMMARY OF THE INVENTION

It is an object of the present invention to provide a machine tool including a double column frame extending from side to side and comprising a pair of vertical columns and a beam extending from side to side between the columns, and a movable unit having a tool rest and movable from side to side along the double column frame, the movable unit being capable of moving stably and smoothly at a high speed from side to side under horizontal forces that are applied to both upper and lower portions of the movable unit even when the beam is deformed by flexing downwardly by gravity and also being capable of machining a workpiece highly accurately without being adversely affected by the deformation of the beam no matter which position the movable unit has moved to in its horizontal stroke.

Another object of the present invention is to provide a machine tool having a second main spindle which is supported well in balance with respect to a transverse direction of the double column frame.

In order to achieve the above object, in accordance with the present invention, there is a machine tool comprising: a double column frame comprising a pair of horizontally spaced columns vertically mounted on a bed and a beam extending horizontally along a Z-axis between upper portions of the columns, the double column frame being horizontally elongate and disposed on the bed; a movable unit horizontally movable along the double column frame, the movable unit having a tool rest for holding a tool for machining a workpiece; a pair of guide rails mounted on the bed and spaced from each other in a direction perpendicular to the Z-axis, the guide rails extending horizontally parallel to each other, the movable unit being horizontally movably supported on the guide rails; and an upper ball screw and a lower ball screw for moving the movable unit horizontally, the upper ball screw and the lower ball screw being mounted respectively on upper and lower portions of the double column frame and extending horizontally and supported by the double column frame; wherein forces are prevented from being transferred between the beam and the movable unit.

Preferably, the bed comprises a flat bed with substantially no slanted surfaces thereon, the bed being installed on a floor and having an upper surface including small steps in a region in which the movable unit is horizontally movable, the guide rails being disposed on the upper surface at the same or substantially the same height from the floor.

Preferably, the double column frame has a horizontally elongate shape and is made of steel.

Preferably, the double column frame has a horizontal length ranging from about 5,000 mm to about 9,200 mm, and the workpiece has an axial length ranging from about 1,000 mm to about 6,000 mm.

Preferably, the upper ball screw is removably mounted on the double column frame.

Preferably, the upper ball screw and the lower ball screw are mounted respectively on upper and lower portions of the columns and extend horizontally between the upper and lower portions of the columns, the movable unit including a cross slide having an upper ball nut and a lower ball nut mounted respectively in upper and lower portions of the cross slide, the upper ball screw having a screw shaft threaded through the upper ball nut, the lower ball screw having a screw shaft threaded through the lower ball nut, the screw shaft of the upper ball screw and the screw shaft of the lower ball screw having substantially identical lengths, identical diameters and shapes, and being made of identical materials.

Preferably, the upper ball screw and the lower ball screw apply horizontal forces respectively upper and lower portions of the movable unit so that a combination of the horizontal force applied by the upper ball screw and the horizontal force applied by the lower ball screw acts on the vertical center of gravity of the movable unit or a position near the center of gravity, for thereby driving the movable unit at the center of gravity for stable and smooth horizontal movement at a high speed.

In order to achieve above another object, in accordance with another aspect of the present invention, there is a machine tool comprising: a machine body including a bed; a tool rest holding a tool and movably mounted on the machine body; a headstock mounted on the machine body for holding a workpiece; a second headstock mounted on the machine body in confronting relation to the headstock, for holding the workpiece; a coolant tank and/or a chip conveyor extending horizontally below the second headstock and disposed in the machine body; a main guide rail extending horizontally substantially below the center of gravity of the second headstock and mounted on the bed, the second headstock being horizontally movably supported on the main guide rail; and at least one auxiliary guide rail extending horizontally and mounted on the bed behind the main guide rail, the second headstock being horizontally movably supported on the auxiliary guide rail against swinging movement.

Preferably, the coolant tank and/or the chip conveyor are taken into and out of a front side of the machine body.

Preferably the main guide rail supports, with a substantially plane-symmetrical structure, front and rear portions of the second headstock which are divided by a plane extending horizontally and including a straight line which extends vertically along an X-axis through the center of gravity of the second headstock.

Preferably, the workpiece has an end rotatably or not rotatably gripped by only a chuck of the headstock and another end rotatably supported by a center mounted on a second workpiece spindle of the second headstock, or the workpiece has an end rotatably or not rotatably gripped by only a second chuck of the second headstock, or the workpiece has an end rotatably gripped by the chuck of the headstock and another end rotatably gripped by the second chuck of the second headstock, such that the workpiece is rotated with the ends thereof being supported.

Preferably, the bed comprises a flat bed with substantially no slanted surfaces thereon, the bed being installed on a floor and having an upper surface including small steps in a region in which the movable unit is horizontally movable, the region in which the movable unit is horizontally movable being a rectangular region defined by a range perpendicular to a horizontal direction and a range in the horizontal direction, the bed including a portion in the region in which the movable unit is horizontally movable, the portion being held at a predetermined height from the floor and another portion in front of the portion in the region in which the movable unit is horizontally movable, the other portion having a predetermined height from the floor, the coolant tank and/or the chip conveyor being housed in a front lower area of the other portion.

Preferably, the machine tool further comprises: a main slide body held in sliding engagement with the main guide rail, the main slide body and the main guide rail jointing providing a main linear guide; and an auxiliary slide body held in sliding engagement with the auxiliary guide rail the auxiliary slide body and the auxiliary guide rail jointing providing an auxiliary linear guide; wherein the main linear guide and the auxiliary linear guide hold the second headstock in vertical directions and directions perpendicular to the vertical directions for preventing the second headstock from being lifted and swinging laterally, so that the second headstock is horizontally movable while being supported and guided by the main linear guide and the auxiliary linear guide.

The machine tool according to the first-mentioned aspect of the present invention is constructed as described above. Even when the beam extending between the upper portions of the columns is deformed by flexing downwardly by gravity, the movable unit with the tool rest can move stably and smoothly at a high speed from side to side under horizontal forces that are applied to both upper and lower portions of the movable unit, and can machine a workpiece highly accurately without being adversely affected by the deformation of the beam no matter which position the movable unit has moved to in its horizontal stroke.

The machine tool according to the second-mentioned aspect of the present invention is constructed as described above. Accordingly, the second main spindle is supported well in balance with respect to the transverse direction of the double column frame.

DESCRIPTION OF THE PREFERRED EMBODIMENT

Figure 1:
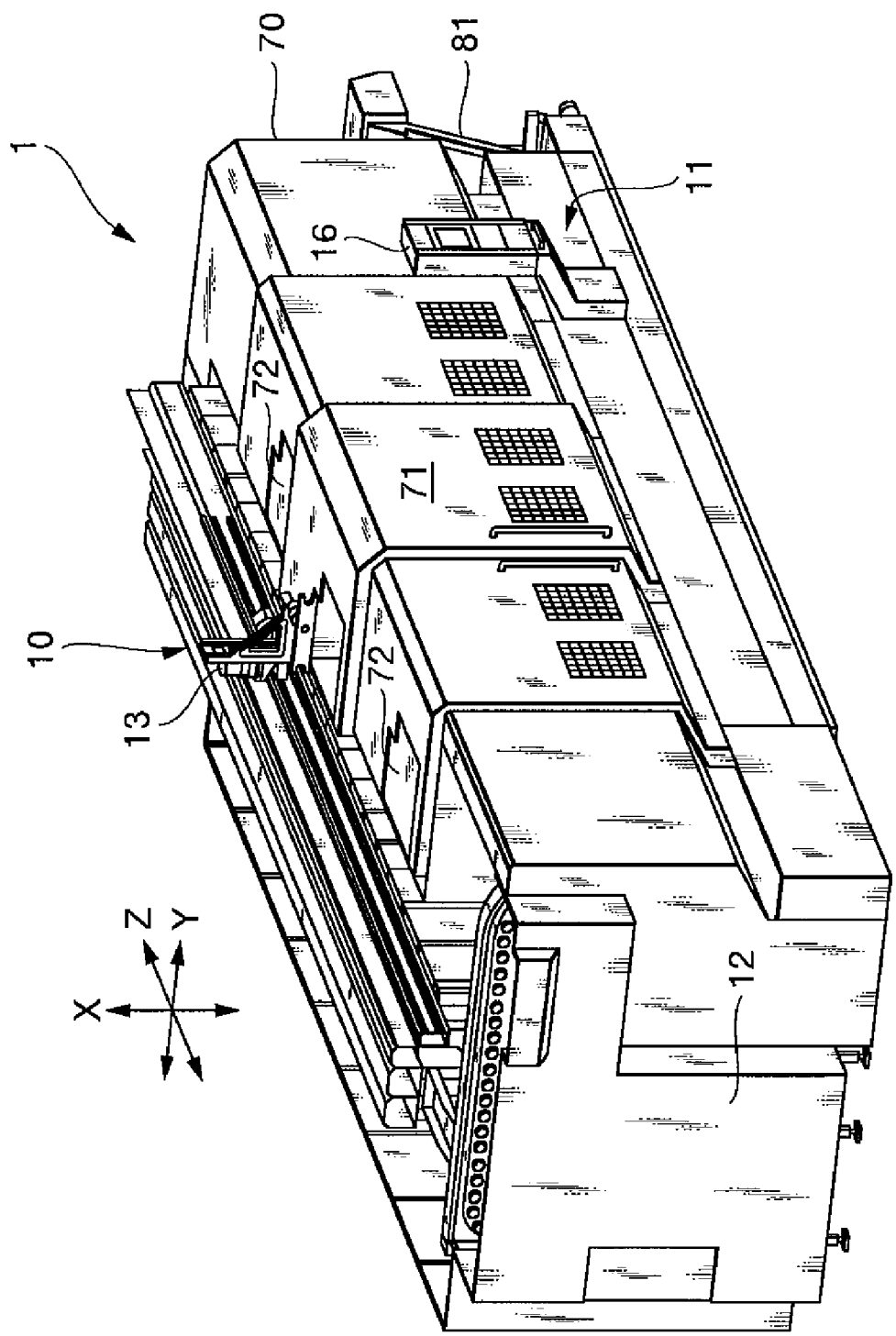
FIG. 1 is a perspective view of a machine tool according to the present invention.

Like or corresponding parts are denoted by like or corresponding reference characters throughout views.

A machine tool according to the present invention includes a pair of horizontally spaced columns vertically mounted on a bed and a beam extending horizontally between upper portions of the columns. The columns and the beam jointly make up a double column frame which is horizontally elongate and disposed on the bed. A movable unit having a tool rest is horizontally movable along the double column frame.

The machine tool includes a pair of guide rails and upper and lower ball screws. The guide rails are mounted on the bed and spaced from each other in a direction perpendicular to the direction in which the movable unit is horizontally movable. The guide rails extend horizontally parallel to each other. The movable unit is horizontally movably supported on the guide rails. The upper and lower ball screws are mounted respectively on upper and lower portions of the double column frame, extending horizontally and being supported by the double column frame, for moving the movable unit horizontally.

Even when the beam is deformed by flexing downwardly by gravity, horizontal forces are applied respectively to upper and lower portions of the movable unit with the tool rest by the upper and lower ball screws. The movable unit is thus movable stably and smoothly at a high speed horizontally from side to side. No matter which position the movable unit has moved to in its horizontal stroke, the tool rest can machine a workpiece with high accuracy without being adversely affected by the deformation of the beam.

Another machine tool according to the present invention includes a machine body, a tool rest, a headstock, a second headstock, and a coolant tank and/or a chip conveyor. A second workpiece spindle is rotatably supported by the second headstock, which is mounted on the machine body in confronting relation to the headstock. The coolant tank and/or the chip conveyor extend horizontally below the second headstock and are disposed in the machine body.

The machine tool has a main guide rail and an auxiliary guide rail. The main guide rail extends horizontally substantially below the center of gravity of the second headstock and is mounted on a bed of the machine body. The second headstock is horizontally movably supported on the main guide rail. The auxiliary guide rail extends horizontally behind the main guide rail and is mounted on the bed. The second headstock is horizontally movably supported on the auxiliary guide rail against swinging movement. The second headstock is thus supported well in balance in directions perpendicular to the direction in which the second headstock is movable.

In an embodiment to be described below, the machine tool comprises a multi-axis turning center. However, the machine tool may be a lathe with a tool spindle mounted on a tool rest, a machining center with a tool spindle mounted on a spindle head, or a grinding machine.

A machine tool according to the present invention will be described below with reference to FIGS. 1 through 9.

Figure 2:
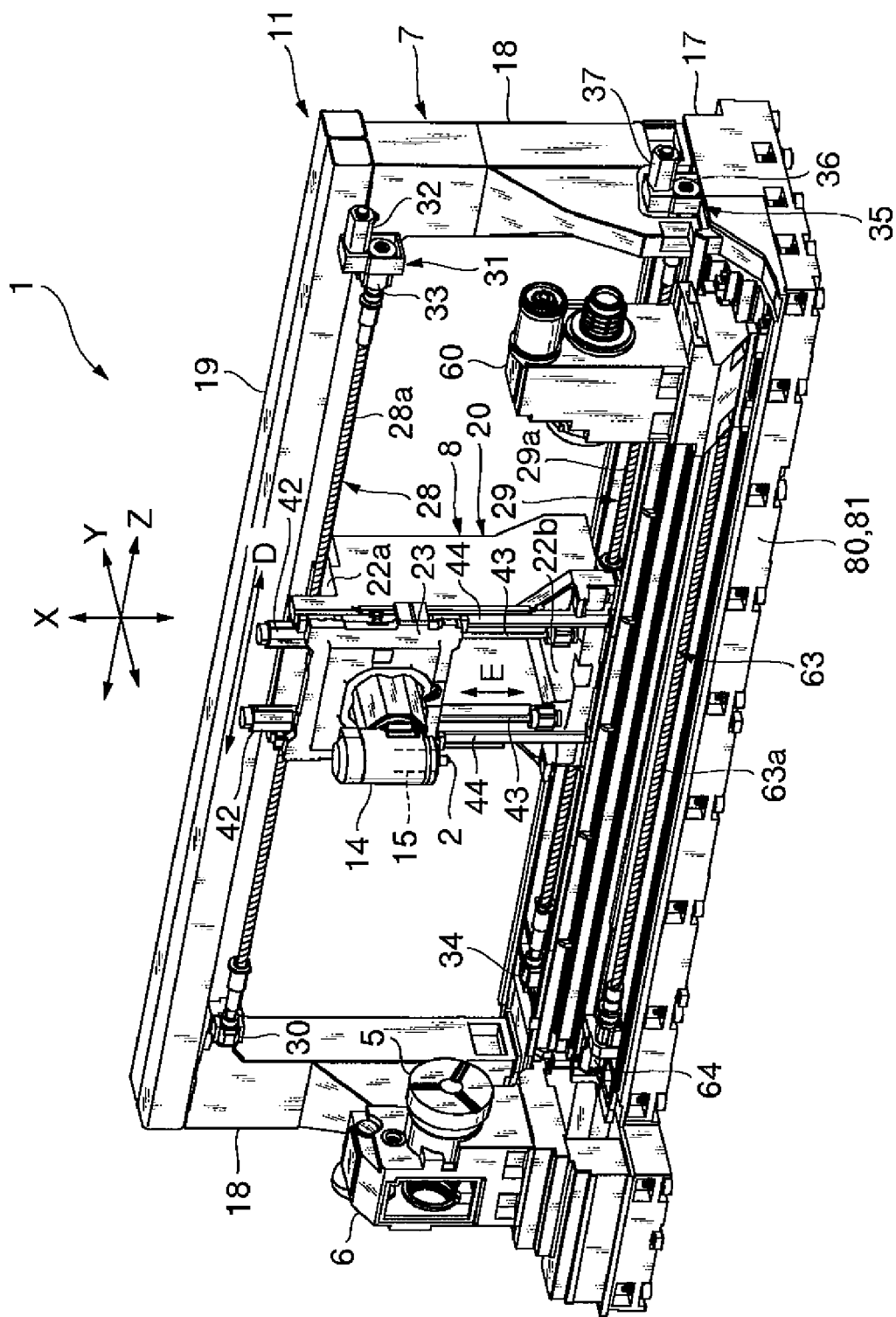
FIG. 2 is a perspective view showing structural details of the machine tool.
Figure 3:
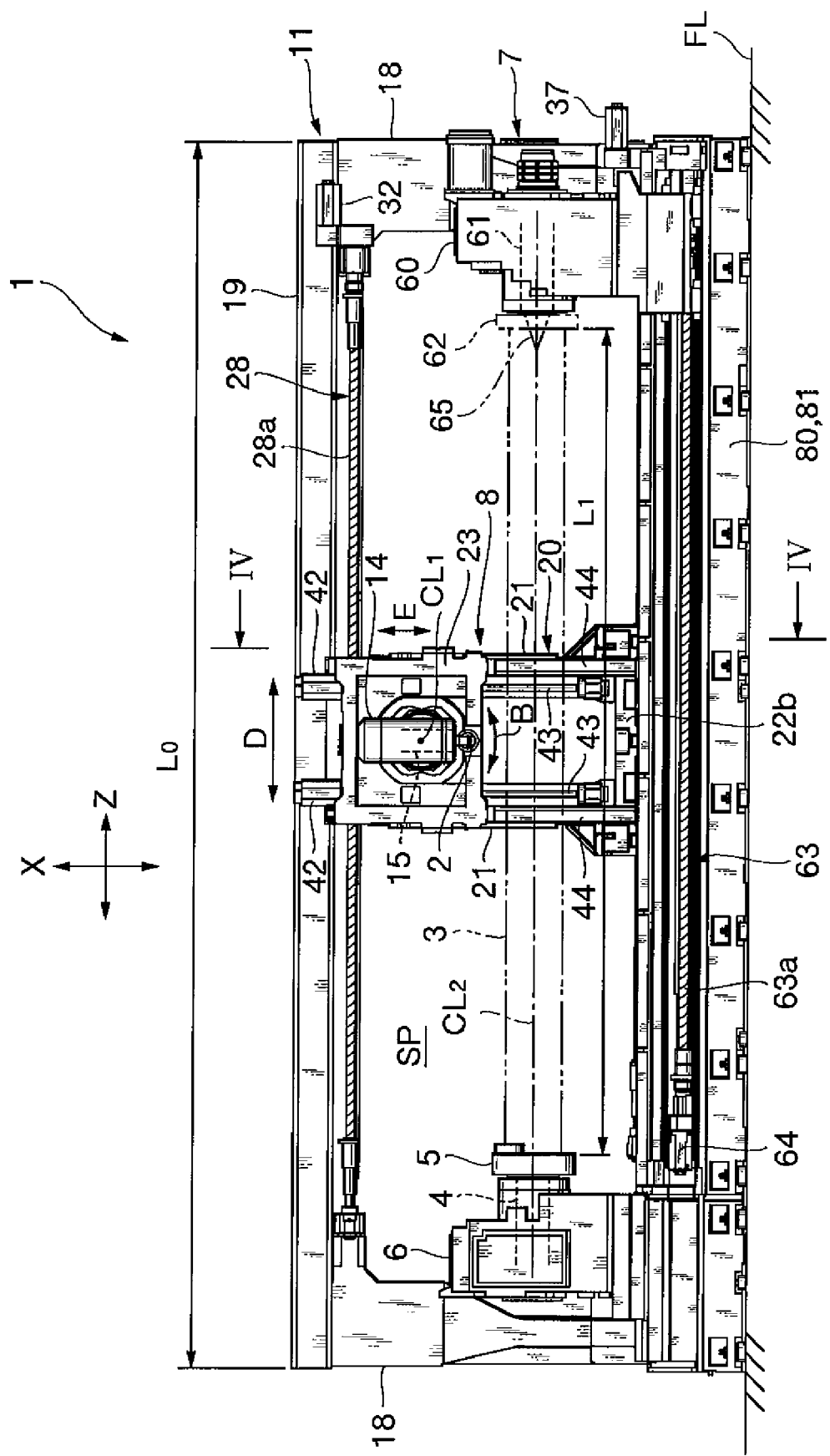
FIG. 3 is a front elevational view showing structural details of the machine tool.
Figure 4:
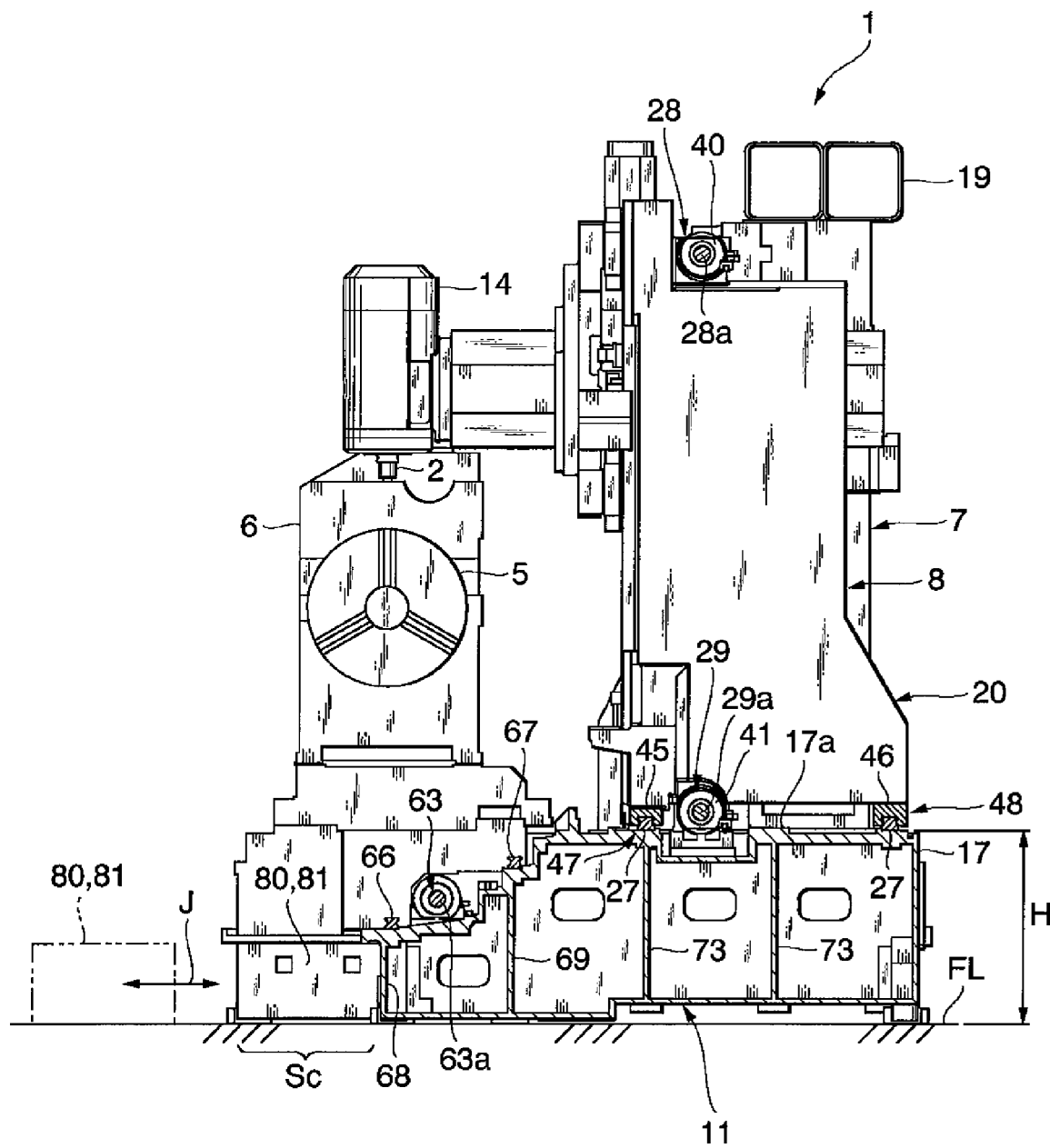
FIG. 4 is a cross-sectional view taken along line IV-IV of FIG. 3.
Figure 5:
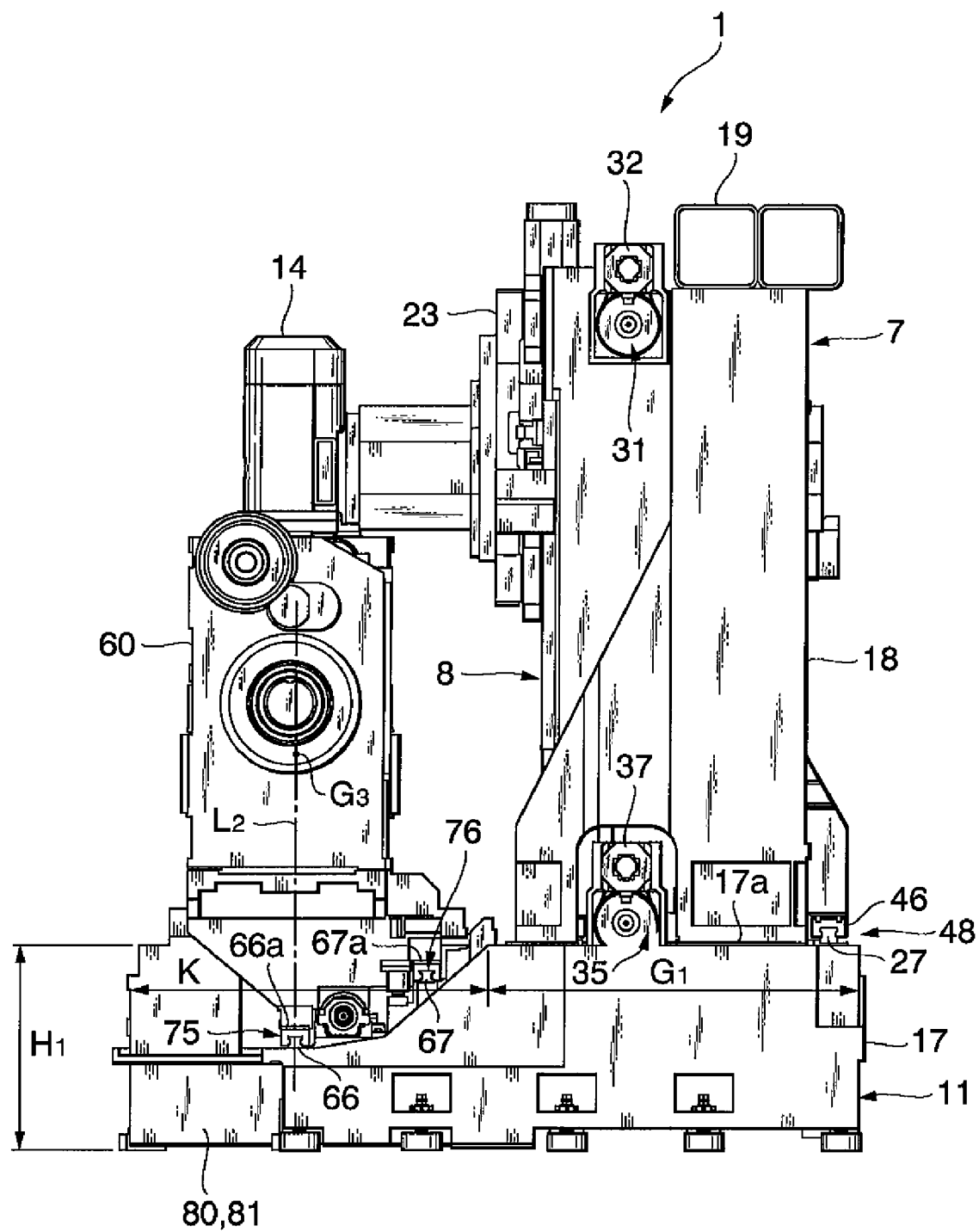
FIG. 5 is a right side elevational view of the machine tool shown in FIG. 3.
Figure 6:
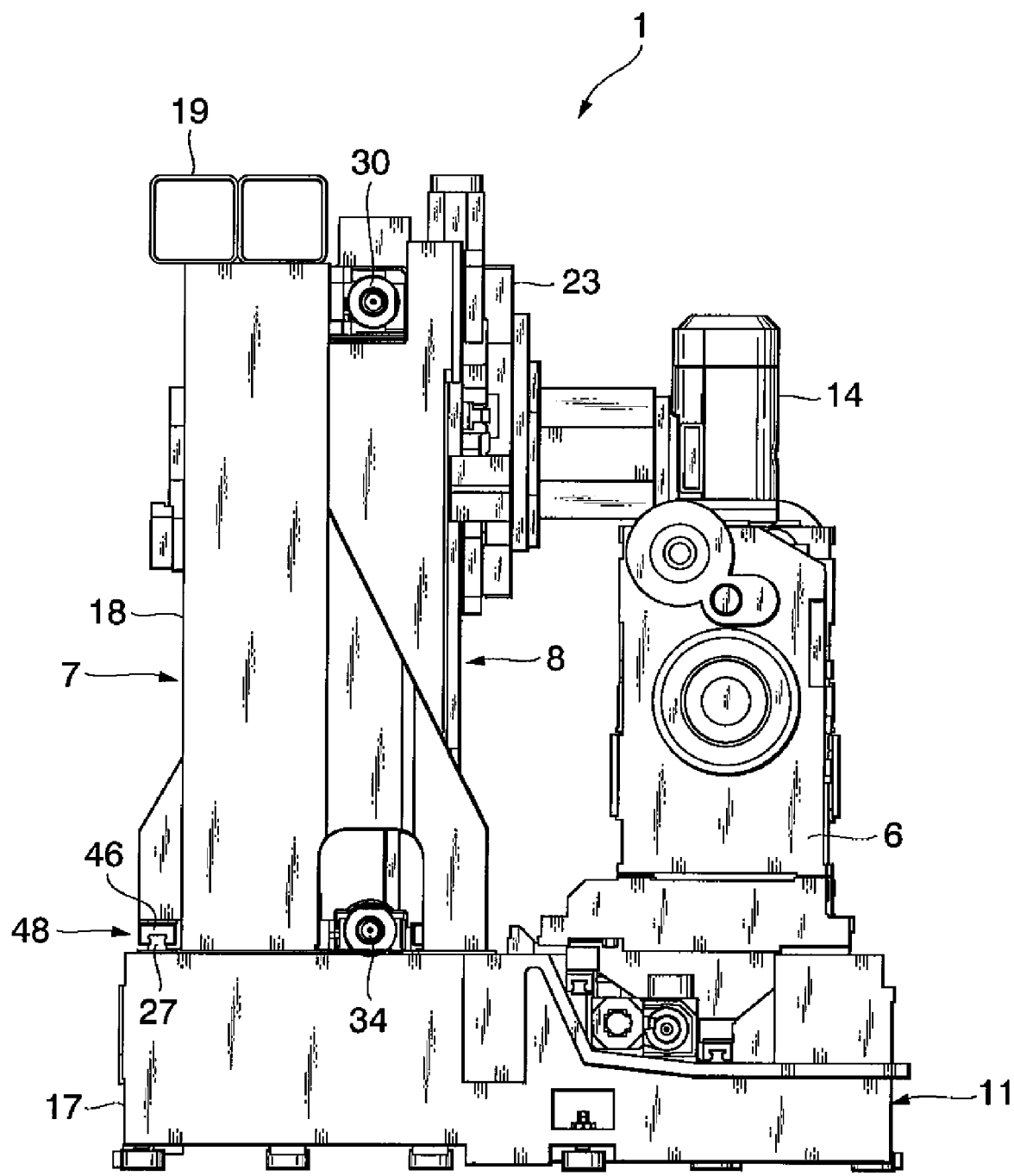
FIG. 6 is a left side elevational view of the machine tool shown in FIG. 3.
Figure 7:
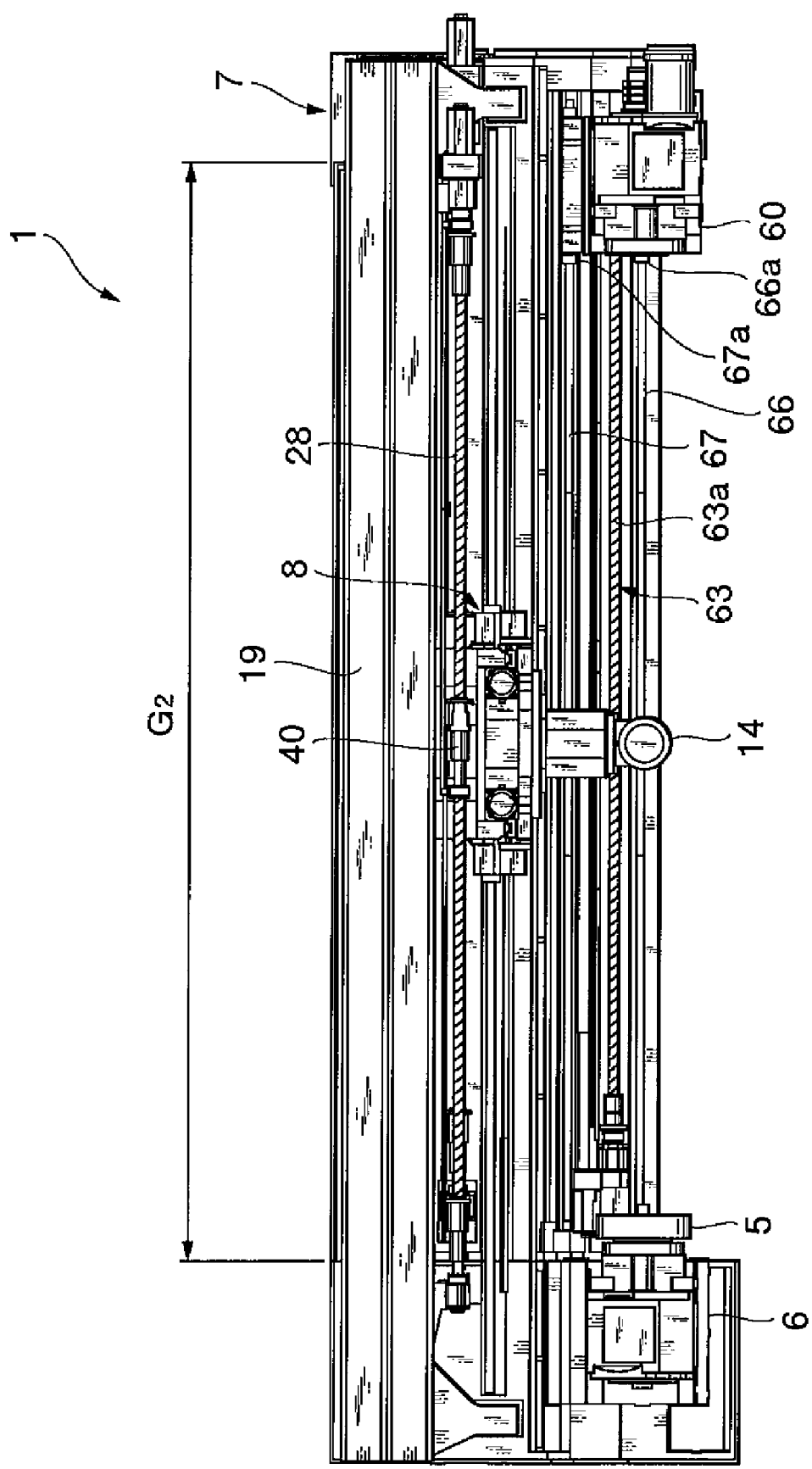
FIG. 7 is a plan view of the machine tool shown in FIG. 3.

FIG. 1 is a perspective view of a machine tool according to the present invention. FIGS. 2 and 3 are a perspective view and a front elevational view, respectively, showing structural details of the machine tool. FIG. 4 is a cross-sectional view taken along line IV-IV of FIG. 3. FIGS. 5, 6 and 7 are a right side elevational view, a left side elevational view, and a plan view, respectively, of the machine tool shown in FIG. 3.

As shown in FIGS. 1 through 7, a machine tool 1 according to the present embodiment comprises a multi-axis turning center. The machine tool 1 includes a headstock 6 and a tool rest 14 having a tool spindle 15. The headstock 6 supports a rotatable workpiece spindle 4 having a chuck 5 for gripping a workpiece 3.

The machine tool 1 functions as a lathe for turning the workpiece 3 with a tool 2 and also as a machining center for cutting the workpiece 3 with another tool 2. The machine tool 1 also functions as a boring machine for boring the workpiece 3 with a boring bar (not shown).

The tool 2 which is used by the machine tool 1 to turn or cut the workpiece 3 is changed by an ATC (Automatic Tool Changer) 10. The tool 2 is mounted on the tool spindle 15 on the tool rest 14 and machines the workpiece 3 which is gripped by the chuck 5.

Various types of tools that can selectively be used as the tool 2 include a tool for turning the workpiece 3, a rotary tool rotatable by the tool spindle 15, and a long boring bar.

The machine tool 1 comprises a machine body 11, the ATC 10 and a magazine 12. The ATC 10 has a movable tool changing unit (hereinafter referred to as "changing unit") 13 for changing tools. The magazine 12, which is attached to the machine body 11, is capable of storing a plurality of tools 2.

When the machine tool 1 is used as a lathe, the tool spindle 15 and the tool 2 do not rotate, but the workpiece 3 rotates and is turned by the tool 2. When the machine tool 1 is used as a machining center, the tool 2 is rotated by the tool spindle 15 to cut the workpiece 3 which is not rotating. At this time, the tool rest 14 functions as a spindle head of the machining center.

The machine tool 1 is controlled by a control apparatus having an NC (Numerical Control) device and a PLC (Programmable Logic Controller). The control apparatus includes a control console 16 disposed in a given position on the machine tool 1.

The machine body 11 has a double column frame 7 comprising a pair of columns 18 and a beam 19. The double column frame 7 is horizontally elongate and mounted on a bed 17 which is installed on a floor FL. The columns 18 are horizontally spaced from each other as viewed in front elevation, and vertically mounted on the bed 17. The beam 19 extends horizontally and is supported on the upper ends of the columns 18.

The columns 18 which extend perpendicularly to the floor FL and the beam 19 extending horizontally between the upper ends of the columns 18 jointly provide the double column frame 7 which extends horizontally. A movable unit 8, which includes the tool rest 14, is horizontally movable along the double column frame 7.

As shown in FIGS. 1 and 2, the machine tool 1 has an X-axis, a Y-axis, and a Z-axis which extend along vertical, transverse, and longitudinal directions, respectively, of the machine tool 1.

The machine tool 1 includes a pair of Z-axis guide rails 27 (see FIG. 4), a Z-axis upper ball screw 28, and a Z-axis lower ball screw 29. No forces will be transferred between the beam 19 and the movable unit 8.

The Z-axis guide rails 27 extend along the Z-axis in the horizontal direction and are spaced from each other along the Y-axis, i.e., in a direction perpendicular to the Z-axis. The Z-axis guide rails 27 are disposed parallel to each other on the bed 17. The movable unit 8 is horizontally movably supported on the Z-axis guide rails 27.

The Z-axis upper ball screw 28 and the Z-axis lower ball screw 29 are mounted respectively on upper and lower portions of the double column frame 7. The Z-axis upper ball screw 28 and the Z-axis lower ball screw 29, which are supported by the double column frame 7, extend along the Z-axis for propelling the movable unit 8 along the Z-axis.

Even when the beam 19 is deformed by flexing downwardly by gravity, forces are applied along the Z-axis to upper and lower portions of the movable unit 8 with the tool rest 14 by the Z-axis upper ball screw 28 and the Z-axis lower ball screw 29.

Accordingly, the movable unit 8 is movable stably and smoothly at a high speed from side to side along the Z-axis. No matter which position the movable unit 8 has moved to along the Z-axis in its horizontal stroke, the tool rest 14 of the movable unit 8 can machine the workpiece 3 with high accuracy without being adversely affected by the deformation of the beam 19.

The movable unit 8 includes a saddle 23 on which the tool rest 14 is mounted and a cross slide 20 on which the saddle 23 is movably supported. The movable unit 8 is movable to any position along the Z-axis and is positioned at the position to which the movable unit 8 has moved.

The cross slide 20 comprises a pair of horizontally spaced vertical members 21, an upper lateral member 22a and a lower lateral member 22b which are joined together into a rectangular box-like frame. The cross slide 20 is horizontally movable along the Z-axis. The cross slide 20 has a lower end movably supported by the bed 17.

The saddle 23 is movably supported on a front side of the cross slide 20 for vertical movement along the X-axis. The saddle 23 is in the form of a rectangular frame as viewed in front elevation. The tool rest 14 is mounted on a front surface of the saddle 23.

The tool 2 is detachably mounted on the tool spindle 15 of the tool rest 14. While the machine tool 1 operates in the turning process, the tool 2 is nonrotatably supported on the tool rest 14. While the machine tool 1 operates in the cutting process, the tool 2 is rotated by the tool rest 14. The tool rest 14 is angularly movable about a central axis CL1 oriented along the Y-axis, and can also be indexed to a desired angular position as indicated by the arrow B (see FIG. 3).

The tool rest 14 has a clamping and unclamping mechanism, not shown, for selectively clamping and unclamping the tool 2 on the tool spindle 15.

As described above, the movable unit 8 has a predetermined shape as a whole, and is movable along the Z-axis as indicated by the arrow D (see FIG. 3).

The Z-axis upper ball screw 28 has opposite ends mounted respectively on upper portions of the columns 18 and extends horizontally along the Z-axis. The Z-axis lower ball screw 29 also has opposite ends mounted respectively on lower portions of the columns 18 and extends horizontally along the Z-axis.

An upper ball nut 40 and a lower ball nut 41 are mounted respectively on upper and lower portions of the cross slide 20.

The Z-axis upper ball screw 28 has a screw shaft 28a threaded through the upper ball nut 40. The Z-axis lower ball screw 29 has a screw shaft 29a threaded through the lower ball nut 41. The Z-axis upper screw shaft 28a and the Z-axis lower screw shaft 29a have substantially identical lengths, identical diameters and shapes, and are made of identical materials.

A bearing unit 30 for bearing the left end (as viewed in FIG. 2) of the Z-axis upper ball screw 28 is mounted on the upper portion of the left column 18. The left end of the Z-axis upper ball screw 28 is rotatably supported by the bearing unit 30.

An upper actuator 31 is mounted on the upper end of the right column 18. The upper actuator 31 comprises a Z-axis upper servomotor 32 and a feed box 33 by which the right end of the Z-axis upper ball screw 28 is rotatably supported. The drive power of the Z-axis upper servomotor 32 is transmitted through the feed box 33 to the Z-axis upper ball screw 28 to rotate the Z-axis upper ball screw 28 about its own axis.

A bearing unit 34 for bearing the left end (as viewed in FIG. 2) of the Z-axis lower ball screw 29 is mounted on the lower portion of the left column 18 or the bed 17 (on the bed 17 according to the illustrated embodiment). The left end of the Z-axis lower ball screw 29 is rotatably supported by the bearing unit 34.

A lower actuator 35 is mounted on the lower end of the right column 18 or the bed 17 (on the right column 18 according to the illustrated embodiment). The lower actuator 35 comprises a Z-axis lower servomotor 37 and a feed box 36 by which the right end of the Z-axis lower ball screw 29 is rotatably supported. The drive power of the Z-axis lower servomotor 37 is transmitted through the feed box 36 to the Z-axis lower ball screw 29 to rotate the Z-axis lower ball screw 29 about its own axis.

The Z-axis upper servomotor 32 and the Z-axis lower servomotor 37 are controlled by the control apparatus to rotate the Z-axis upper ball screw 28 and the Z-axis lower ball screw 29 about their own axes in synchronism with each other. The Z-axis upper ball screw 28 and the Z-axis lower ball screw 29 are rotated respectively by the Z-axis upper servomotor 32 and the Z-axis lower servomotor 37 through the respective feed boxes 33, 36.

At this time, the Z-axis upper ball screw 28 and the Z-axis lower ball screw 29 are rotated in synchronism in the same direction, at the same rotational speed, through the same rotational angle, and by the same number of revolutions.

When the machine tool 1 is operated to machine the workpiece 3, the Z-axis upper servomotor 32 and the Z-axis lower servomotor 37 are energized to rotate the upper screw shaft 28a and the lower screw shaft 29a about their own axes. As the upper ball nut 40 and the lower ball nut 41 are fixed to the cross slide 20, the cross slide 20 moves along the Z-axis as indicated by the arrow D while being supported and guided by the Z-axis guide rails 27.

The movable unit 8 now moves along the Z-axis under the drive power transmitted from the upper screw shaft 28a and the lower screw shaft 29a through the upper ball nut 40 and the lower ball nut 41.

The cross slide 20 supports thereon a pair of X-axis servomotors 42, a pair of X-axis ball screws 43 and a pair of X-axis guide rails 44 for moving the saddle 23 along the X-axis.

The X-axis ball screws 43 have ends coupled to the X-axis servomotors 42 and are rotatable about their own axes by the X-axis servomotors 42. When the X-axis ball screws 43 are rotated about their own axes by the X-axis servomotors 42, the saddle 23 moves along the X-axis as indicated by the arrow E (see FIGS. 2 and 3) while being supported and guided by the X-axis guide rails 44.

As shown in FIG. 4, a front slide body (front block) 45 and a rear slide body (rear block) 46 are mounted on a lower portion of the cross slide 20. The front slide body 45 and the rear slide body 46 are disposed at substantially the same height from the floor FL, and are oriented along the Z-axis parallel to each other.

The front slide body 45 is held in sliding engagement with the front Z-axis guide rail 27, jointly making up a front linear guide 47. The rear slide body 46 is held in sliding engagement with the rear Z-axis guide rail 27, jointly making up a rear linear guide 48.

The movable unit 8 is supported and guided by the front and rear linear guides 47, 48 for movement along the Z-axis.

Although the front linear guide 47 and the rear linear guide 48 are disposed at substantially the same height from the floor FL in the illustrated embodiment, the front linear guide 47 and the rear linear guide 48 may be disposed at different heights from the floor FL.

Instead of the linear guides 47, 48, slide guides may be used to guide the movable unit 8 for movement along the Z-axis.

The Z-axis upper ball screw 28 on the upper portion of the double column frame 7 may be removably mounted on the double column frame 7. With the Z-axis upper ball screw 28 being removable, the present invention is applicable to a machine tool which does not require the Z-axis upper ball screw 28, but requires the Z-axis lower ball screw 29, with a simple design change.

Specifically, if the movable unit 8 can be moved stably and smoothly at a high speed along the Z-axis by only the Z-axis lower ball screw 29, then the Z-axis upper ball screw 28 and the Z-axis upper servomotor 32 may be dispensed with, making the machine tool simpler in structure.

The headstock 6, by which the workpiece spindle 4 is rotatably supported, is disposed on the left side of the double column frame 7. The chuck 5 is detachably mounted on the distal end of the workpiece spindle 4 which is rotatably supported on the headstock 6. The workpiece 3, which is gripped by the chuck 5, can be rotated by the workpiece spindle 4 about a central axis CL2 oriented along the Z-axis.

For cutting the workpiece 3 with the tool 2 in the form a rotary tool, the headstock 6 can be controlled to cause the workpiece spindle 4 to index the workpiece 3 to a given angular position.

The machine tool 1 has a second headstock 60 disposed in front of a right portion of the double column frame 7 and confronting the headstock 6 along the Z-axis. A second workpiece spindle 61 is rotatably supported by the second headstock 60. A second chuck 62 for gripping the workpiece 3 is removably mounted on the distal end of the second workpiece spindle 61. The workpiece 3 which is gripped by the second chuck 62 is rotatable about the central axis CL2 by the second workpiece spindle 61.

The second headstock 60 is movable along the Z-axis while being supported and guided by a linear guide. A ball screw 63 for actuating the second headstock 60 has a screw shaft 63*a* mounted on the bed 17. The screw shaft 63*a* is threaded through a ball nut which is fixed to the second headstock 60.

A second headstock servomotor 64 is mounted on the bed 17 and is connected to an end of the ball screw 63. When the second headstock servomotor 64 is energized, the screw shaft 63*a* is rotated about its own axis to move the second headstock 60 guided by the linear guide along the Z-axis.

If the workpiece 3 is of a long dimension, the opposite ends of the workpiece 3 can be gripped respectively by the headstock 6 and the second headstock 60. Instead of the second chuck 62, a center 65 may be removably mounted on the second workpiece spindle 61 for supporting the right end of the workpiece 3. The center 65 added to the second headstock 60 allows the second headstock 60 to function as a tailstock.

The workpiece 3 can be rotatably or nonrotatably gripped by only the chuck 5 on the headstock 6. At this time, if the center 65 is mounted on the second workpiece spindle 61, then the center 65 can support the right end of the workpiece 3 to allow the workpiece 3 to rotate more stably.

Alternatively, the workpiece 3 can be rotatably or nonrotatably gripped by only the second chuck 62 on the second headstock 60.

In addition, the chuck 5 of the headstock 6 can grip the left end of the workpiece 3 and the second chuck 62 of the second headstock 60 can grip the right end of the workpiece 3 for thereby supporting the workpiece 3 at its opposite ends while the workpiece 3 is in rotation.

The machine tool 1 is an elongate machine tool having a horizontally long machining area SP extending along the Z-axis. The machine tool 1 is suitable for machining the workpiece 3 which has a long dimension.

The double column frame 7 of the elongate machine tool 1 is also horizontally long along the Z-axis. Since the horizontally long double column frame 7 cannot be produced as an integral casting, it is made of steel.

The double column frame 7 of steel is less rigid than an equivalent double column frame in the form of a casting. Particularly, the beam 19 extending horizontally along the Z-axis in the upper portion of the double column frame 7 tends to be deformed by flexing downwardly by gravity.

Heretofore, a double column frame in the form of a casting has a horizontal length L0 (see FIG. 3) of up to about 5,000 mm. As a result, the workpiece 3 which can be machined has an axial length L1 limited by the horizontal length L0 of the double column frame.

With the machine tool 1 according to the present embodiment, however, the double column frame 7 has a horizontal length L0 in the range from about 5,000 mm to about 9,200 mm, and hence can be much longer. Therefore, the machine tool 1 is capable of machining the workpiece 3 which has an axial length L1 in the range from about 1,000 mm to about 6,000 mm. The machine tool 1 can also machine the workpiece 3 which is shorter than the above axial length L1.

Accordingly, the machine tool 1 can machine highly accurately the workpiece 3 whose axial length L1 is much greater than heretofore.

The bed 17 is a flat bed with substantially no slanted surfaces thereon though an upper surface 17*a* thereof may have small steps in the region in which the movable unit 8 is horizontally movable. The region in which the movable unit 8 is horizontally movable refers to a substantially rectangular region defined by a range G1 (see FIG. 5) along the Y-axis and a range G2 (see FIG. 7) along the Z-axis.

The Z-axis guide rails 27 are mounted on the flat upper surface 17*a* of the bed 17 and are kept at the same or substantially the same height H from the floor FL. Therefore, reactive forces, which are applied to the movable unit 8 when the tool 2 is machining the workpiece 3, can be distributed over the flat upper surface 17*a* of the bed 17. Since any deformations of the movable unit 8 which may be caused by such reactive forces are reduced, the tool 2 can machine the workpiece 3 with high accuracy.

The region, in which the movable unit 8 is horizontally movable, which is defined by the ranges G1, G2 over the bed 17 is also kept at the height H. A portion K (see FIG. 5) of the bed 17 in front of the region, in which the movable unit 8 is horizontally movable, has a height H1 which can be greater than heretofore. Therefore, the rigidity of the portion K of the bed 17 can greatly be increased. A coolant tank 80 and a chip conveyor 81 extend horizontally and are housed in a front lower area of the portion K of the bed 17.

Structural details of the second headstock 60 and its support structure will be described below.

The machine tool 1 has the machine body 11, the tool rest 14, the headstock 6, the second headstock 60, and one or both of the coolant tank 80 and the chip conveyor 81 (both of the coolant tank 80 and the chip conveyor 81 according to the illustrated embodiment).

The tool rest 14, which holds the tool 2, is movably mounted on the machine body 11. The headstock 6 is mounted on the machine body 11 and can hold the workpiece 3. The second headstock 60 is mounted on the machine body 11 in confronting relation to the headstock 6 and can hold the workpiece 3. The coolant tank 80 and the chip conveyor 81 are positioned below the second headstock 60, and extend horizontally along the Z-axis in the machine body 11.

The machine tool 1 has a main guide rail 66 and at least one (one according to the illustrated embodiment) auxiliary guide rail 67.

The main guide rail 66 extends horizontally along the Z-axis substantially below the center G3 of gravity of the second headstock 60 and is mounted on the bed 17 of the machine body 11. The second headstock 60 is horizontally movably supported on the main guide rail 66.

The main guide rail 66 is aligned with a straight line L2 which extends vertically through the center G3 of gravity of the second headstock 60. Therefore, the main guide rail 66 supports, with a substantially plane-symmetrical structure, front and rear portions of the second headstock 60 which are divided by a plane extending along the Z-axis and including the straight line L2 which extends vertically through the center G3 of gravity of the second headstock 60.

The auxiliary guide rail 67 is mounted, on the bed 17, behind the main guide rail 66 (behind and above the main guide rail 66 according to the illustrated embodiment). The second headstock 60 is horizontally movable supported on the auxiliary guide rail 67 against swinging movement.

Most of the load imposed by the second headstock 60 is borne by the main guide rail 66. The auxiliary guide rail 67 mainly functions to prevent the second headstock 60 from being tilted along the X-axis.

One or both of the coolant tank 80 and the chip conveyor 81 (both of the coolant tank 80 and the chip conveyor 81 according to the illustrated embodiment) can be taken out of and inserted into the front side of the machine body 11.

A main slide body (main block) 66a and an auxiliary slide body (auxiliary block) 67a are mounted on a lower portion of the second headstock 60. The auxiliary slide body 67a is disposed behind and above the main slide body 66a. The main slide body 66a and the auxiliary slide body 67a are oriented along the Z-axis parallel to each other.

The main slide body 66a is held in sliding engagement with the main guide rail 66, jointly making up a main linear guide 75. The auxiliary slide body 67a is held in sliding engagement with the auxiliary guide rail 67, jointly making up an auxiliary linear guide 76.

The main linear guide 75 and the auxiliary linear guide 76 hold the second headstock 60 in vertical directions along the X-axis and directions along the Y-axis which are perpendicular to the vertical directions for preventing the second headstock 60 from being lifted and swinging laterally. The auxiliary linear guide 76 functions to prevent the second headstock 60 from being tilted.

The second headstock 60 is horizontally movable along the Z-axis while being supported and guided by the main linear guide 75 and the auxiliary linear guide 76.

The auxiliary linear guide 76 is located behind the main linear guide 75. Accordingly, the main guide rail 66 and the auxiliary guide rail 67 may be disposed at the same height from the floor FL, or the auxiliary guide rail 67 may be disposed behind and below the main guide rail 66 or a plurality of auxiliary guide rails 67 may be provided at different heights and different positions along the Y-axis.

Instead of the linear guides 75, 76, slide guides may be used to guide the second headstock 60 for movement along the Z-axis.

The bed 17 includes integral vertical frames 68, 69, 73 for bearing the loads of various devices and mechanisms of the machine tool 1. The loads imposed on the main guide rail 66 and the auxiliary guide rail 67 are mainly borne by the frames 68, 69 which are positioned below the main guide rail 66 and the auxiliary guide rail 67.

Since the auxiliary guide rail 67 is disposed behind the main guide rail 66, no guide rail is disposed in front of the main guide rail 66. As a result, the bed 17 has no vertical frame in its portion in front of the main guide rail 66 because no large load is imposed on the that portion of the bed 17.

Therefore, a space Sc extends horizontally in the portion of the bed 17 in front of the main guide rail 66. The space Sc may be opened forwardly. The coolant tank 80 and the chip conveyor 81 are housed in the space Sc in the bed 17. As indicated by the arrow J, the tank 80 and the chip conveyor 81 can be taken into and out of the space Sc.

As described above, the main guide rail 66 is disposed below the center G3 of gravity of the second headstock 60, and the second headstock 60 is horizontally movably supported by the main guide rail 66. The main guide rail 66 supports, with a substantially plane-symmetrical structure, front and rear portions of the second headstock 60 which are divided by a plane extending along the Z-axis and including the straight line L2 which extends vertically through the center G3 of gravity of the second headstock 60.

Consequently, the main guide rail 66 can bear the load from the second headstock 60 well in balance along the Y-axis.

When the bed 17 is deformed due to a temperature change, the deformation is transmitted to the second headstock 60 through the main guide rail 66 which bears most of the load from the second headstock 60. The second headstock 60 is then moved or expanded or contracted vertically along the straight line L2 passing through the center G3 of gravity. The auxiliary guide rail 67 bears almost no load from the second headstock 60, so that the thermally induced deformation of the bed 17 is not essentially transmitted to the second headstock 60 through the auxiliary guide rail 67.

When the motor incorporated in the second headstock 60 is heated or when the room temperature changes, the temperature of the second headstock 60 also changes. The second headstock 60 which is basically supported by only the main guide rail 66 is then thermally deformed, i.e., expanded or contracted vertically along the straight line L2 passing through the center G3 of gravity.

As a result, the thermally induced deformation of the bed 17 and the second headstock 60 is uniformly distributed to the front and rear portions of the second headstock 60. Consequently, the workpiece 3 can be machined accurately using the second headstock 60.

The coolant tank 80 and the chip conveyor 81 which extends horizontally along the Z-axis in the space Sc below the second headstock 60 are pulled out as indicated by the arrow J when they need to be serviced for maintenance. Accordingly, no space is required on the opposite longitudinal ends of the machine tool 1 along the Z-axis for the maintenance of the coolant tank 80 and the chip conveyor 81.

Specifically, when the coolant tank 80 and the chip conveyor 81 need to be serviced for maintenance, the coolant tank 80 and the chip conveyor 81 are pulled out forwardly from the space Sc, not from the opposite longitudinal ends of the machine tool 1. Therefore, no space is required on the opposite longitudinal ends of the machine tool 1 along the Z-axis for receiving the coolant tank 80 and the chip conveyor 81.

The machine tool 1 as such a space saver is highly advantageous because the machine tool 1 is an elongate machine tool extending horizontally long along the Z-axis and hence the coolant tank 80 and the chip conveyor 81 also long along the Z-axis.

As described above, the second chuck 62 or the center 65 is removably mounted on the second workpiece spindle 61 on the second headstock 60. Therefore, the term "second headstock" used herein should be construed to cover a tailstock with the center 65 mounted on the second workpiece spindle 61.

The machining area SP is covered with a splash guard 70 (see FIG. 1) for preventing the coolant and chips from being scattered out. The splash guard 70 has a plurality of doors 71 which can selectively opened and closed. The splash guard 70 also has a plurality of openable and closable shutters 72 in the ceilings of the respective doors 71.

When the shutters 72 are opened, they provide openings for allowing the tool changing unit 13 to move therethrough. When the shutters 72 are closed, the machining area SP is covered with the splash guard 70. The tool changing unit 13 is disposed outside of the splash guard 70 for movement along the Z-axis for changing tools through the openings provided by the shutters 72.

Operation of the machine tool 1 will be described below.

When the machine tool 1 functions as a lathe, if the workpiece 3 is of a long dimension, the left end of the workpiece 3 is gripped by the chuck 5 of the headstock 6 and the right end of the workpiece 3 is gripped by the second chuck 62 or the center 65 of the second headstock 60. At this time, the second workpiece spindle 61 is held rotatable under no load. Then, the workpiece spindle 4 of the headstock 6 is rotated to rotate the workpiece 3 about its own axis.

The movable unit 8 is then moved along the Z-axis as indicated by the arrow D, and the saddle 23 is moved along the X-axis as indicated by the arrow E. The tool rest 14 is swiveled about the central axis CL1 as indicated by the arrow B, and the tool 2 is held nonrotatable. The workpiece 3 is now turned by the tool 2 in the turning process.

When the machine tool 1 functions as a machining center, the tool 2 is rotated by the tool spindle 15 of the tool rest 14. At this time, the workpiece 3 which is gripped by one or both of the headstock 6 and the second headstock 60 is held nonrotatable.

The movable unit 8 is then moved along the Z-axis as indicated by the arrow D, and the saddle 23 is moved along the X-axis as indicated by the arrow E. The tool rest 14 is swiveled about the central axis CL1 as indicated by the arrow B. The workpiece 3 is now machined by the rotating tool 2 in the cutting process.

Figure 8A:
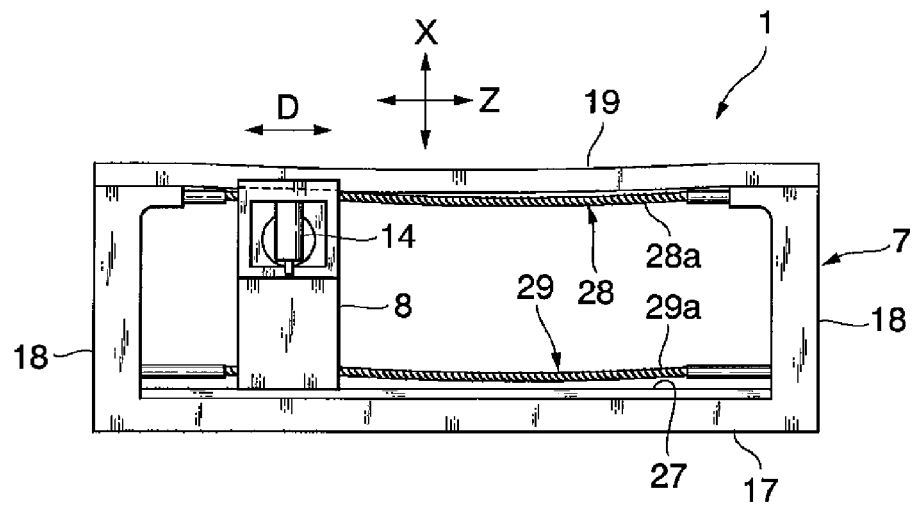
FIGS. 8A, 8B and 8C are schematic views illustrative of deformations of a double column frame and ball screws of the machine tool.
Figure 8B:
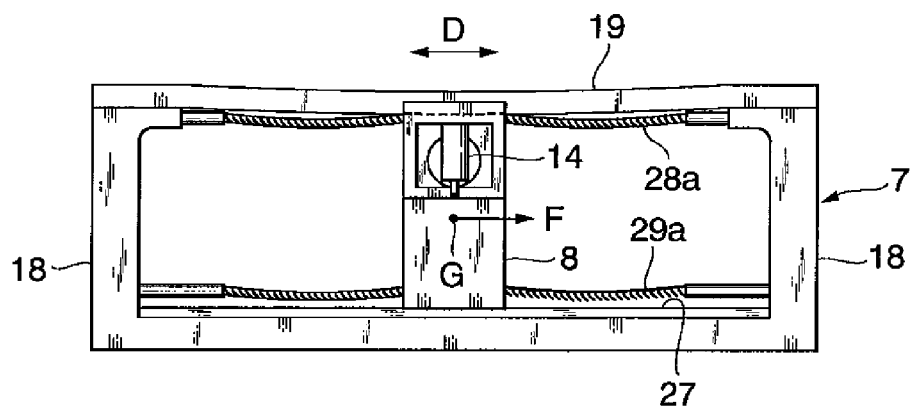
Figure 8C:
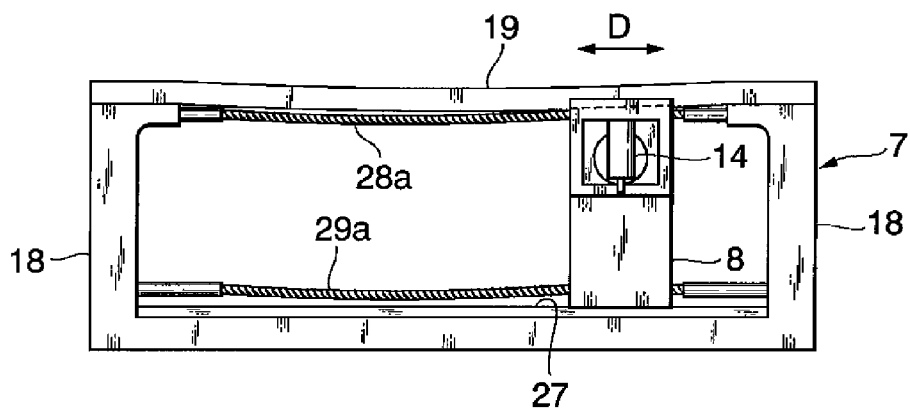
Figure 9:
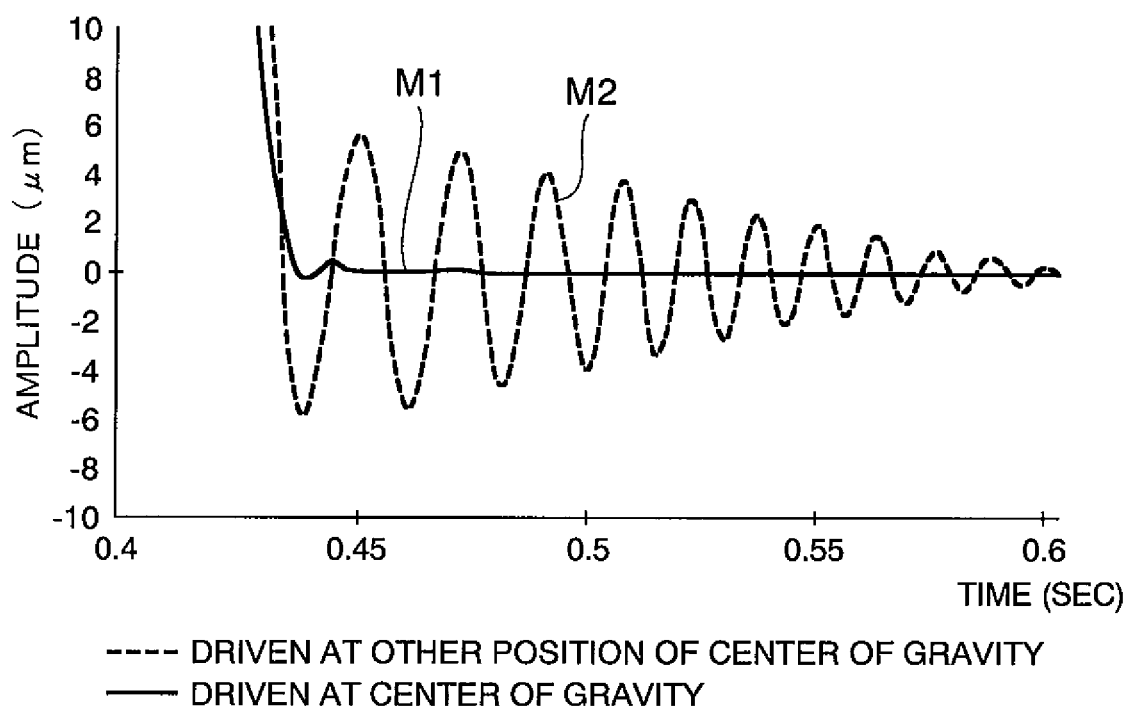
FIG. 9 is a graph showing residual vibrations of a tool rest.

FIGS. 8A, 8B and 8C are schematic views illustrative of deformations of the double column frame 7 and the ball screws 28, 29 of the machine tool 1. FIG. 9 is a graph showing residual vibrations of the tool rest 14.

The double column frame 7 is of a shape which is elongate horizontally along the Z-axis and is made of steel. Therefore, the horizontally extending beam 19 in the upper portion of the double column frame 7 tends to flex downwardly by gravity as shown in FIGS. 8A, 8B and 8C.

In FIGS. 8A, 8B and 8C, the deformations of the beam 18 and the ball screws 28, 29 are shown as exaggerated for an easier understanding of the invention.

The movable unit 8 can move from a position (FIG. 8A) near the left column 18 through a position (FIG. 8B) between the left and right columns 18 to a position (FIG. 8C) near the right column 18, and can be positioned in any position which may be one of those positions and other positions therebetween.

Since the span between the left and right columns 18 is long, the beam 19 extending horizontally between the upper ends of the columns 18 tends to flex downwardly by gravity. The Z-axis guide rails 27 on the bed 17 are not deformed by gravity because they are directly mounted on the bed 17.

The movable unit 8 is supported on the guide rails 27 for movement along the Z-axis as indicated by the arrow D. As no forces are transferred between the beam 19 and the movable unit 8, the movable unit 8 is not adversely affected by the deformation of the beam 19.

Therefore, no matter which position the movable unit 8 has moved to along the Z-axis, or stated otherwise, regardless of whether the movable unit 8 has moved to a position near the left or right column 18 or a position remote from the left or right column 18, the movable unit 8 is not subject to forces from the beam 19.

While the machine tool 1 is machining the workpiece 3, the movable unit 8 is subject to reactive forces from the workpiece 3, but is not subject to forces from the beam 19. As a result, no matter which position the movable unit 8 has moved to along the Z-axis, the movable unit 8 is not adversely affected by the deformation of the beam 19. Accordingly, the workpiece 3 is machined stably with high accuracy by the tool 2 supported by the tool rest 14 mounted, on the movable unit 8.

The double column frame 7 is horizontally elongate along the Z-axis. Therefore, the screw shaft 28a of the Z-axis upper ball screw 28 and the screw shaft 29a of the Z-axis lower ball screw 29, which extend horizontally in the upper and lower portions of the double column frame 7, also tend to flex downwardly by gravity.

Inasmuch as the upper and lower screw shafts 28a, 29a have substantially identical lengths, identical diameters and shapes, and are made of identical materials, they are deformed to the same extent. The upper and lower screw shafts 28a and 29a extend along the Z-axis perpendicular to the downward direction of their deformations. The Z-axis upper ball screw 28 and the Z-axis lower ball screw 29 apply forces along the Z-axis to the movable unit 8.

Accordingly, the movable unit 8 is moved highly accurately along the Z-axis without being adversely affected by the deformations of the screw shafts 28a and 29a.

Specifically, the Z-axis upper ball screw 28 and the Z-axis lower ball screw 29 apply horizontal forces along the Z-axis to respective upper and lower portions of the movable unit 8. A combination (combined force) F of the horizontal force applied along the Z-axis by the Z-axis upper ball screw 28 and the horizontal force applied along the Z-axis by the Z-axis lower ball screw 29 acts on the center G of gravity of the movable unit 8 or a position near the center G of gravity.

Consequently, the movable unit 8 is actuated by the force acting on the center G of gravity, i.e., the movable unit 8 is driven at the center G of gravity. The movable unit 8 driven at the center G of gravity can be moved stably and smoothly at a high speed along the Z-axis.

With the double column frame 7 being of a horizontally elongate shape, it has heretofore been difficult to drive the movable unit 8 at the center G of gravity thereof. Particularly, if the machine tool 1 is large in size, then since the beam 19 flexes downwardly by gravity it has been more difficult to driven the movable unit 8 at the center G of gravity thereof.

According to the present invention, however, the load from the movable unit 8 is borne by only the Z-axis guide rails 27 mounted on the bed 17, and no forces are transferred between the beam 19 and the movable unit 8. Therefore, the movable unit 8 can be driven at the center G of gravity.

When the movable unit 8 has been moved along the Z-axis and then positioned and held at rest, the tool rest 14 is liable to keep vibrating due to "residual vibrations" caused by the movement of the movable unit 8.

FIG. 9 is a graph showing such residual vibrations of the tool rest 14. The graph has a horizontal axis representing time and a vertical axis the amplitude of residual vibrations. FIG. 9 shows a solid-line curve M1 representing changes in the amplitude of residual vibrations when the movable unit 8 is driven at the center G of gravity, and a broken-line curve M2 representing changes in the amount of residual vibrations when the movable unit 8 is driven at other position of the center G of gravity.

The solid-line curve M1 indicates that when the movable unit 8 is driven at the center G of gravity, since vibrations produced upon movement of the movable unit 8 are reduced, the tool rest 14 causes almost no residual vibrations. As a result, the machine tool 1 is capable of machining the workpiece 3 highly accurately at a high speed.

The machine tool according to the present invention is applicable to a lathe, a machining center or a grinding machine, as well as a multi-axis turning center.

Although certain preferred embodiments of the present invention have been shown and described in detail it should be understood that various changes and modifications may be made therein without departing from the scope of the appended claims.

What is claimed is:
1. A machine tool comprising:
   a double column frame comprising a pair of horizontally spaced columns vertically mounted on a bed and a beam extending horizontally along a Z-axis between upper portions of the columns, said double column frame being horizontally elongate and disposed on said bed;

a movable unit horizontally movable along said double column frame, said movable unit having a tool rest for holding a tool for machining a workpiece;

a pair of guide rails mounted on said bed and spaced from each other in a direction perpendicular to said Z-axis, said guide rails extending horizontally parallel to each other, said movable unit being horizontally movably supported on said guide rails; and an upper ball screw and a lower ball screw for moving said movable unit horizontally said upper ball screw and said lower ball screw being mounted respectively on upper and lower portions of said double column frame and extending horizontally and supported by said double column frame;

wherein forces are prevented from being transferred between said beam and said movable unit.

2. A machine tool according to claim 1,
wherein said bed comprises a flat bed with substantially no slanted surfaces thereon, said bed being installed on a floor and having an upper surface including small steps in a region in which said movable unit is horizontally movable, said guide rails being disposed on said upper surface at the same or substantially the same height from said floor.

3. A machine tool according to claim 1,
wherein said double column frame has a horizontally elongate shape and is made of steel.

4. A machine tool according to claim 3,
wherein said double column frame has a horizontal length ranging from about 5,000 mm to about 9,200 mm, and said workpiece has an axial length ranging from about 1,000 mm to about 6,000 mm.

5. A machine tool according to claim 1, wherein said upper ball screw is removably mounted on said double column frame.

6. A machine tool comprising:
a machine body including a bed;
a tool rest holding a tool and movably mounted on said machine body;
a headstock mounted on said machine body, for holding a workpiece;
a second headstock mounted on said machine body in confronting relation to said headstock, for holding said workpiece;
a coolant tank and/or a chip conveyor extending horizontally below said second headstock and disposed in said machine body;
a main guide rail extending horizontally substantially below the center of gravity of said second headstock and mounted on said bed, said second headstock being horizontally movably supported on said main guide rail; and
at least one auxiliary guide rail extending horizontally and mounted on said bed behind said main guide rail, said second headstock being horizontally movably supported on said auxiliary guide rail against swinging movement.

7. A machine tool according to claim 6,
wherein said coolant tank and/or said chip conveyor are taken into and out of a front side of said machine body.

8. A machine tool according to claim 6,
wherein said main guide rail supports, with a substantially plane-symmetrical structure, front and rear portions of said second headstock which are divided by a plane extending horizontally and including a straight line which extends vertically along an X-axis through the center of gravity of said second headstock.

9. A machine tool according to claim 6,
wherein said bed comprises a flat bed with substantially no slanted surfaces thereon, said bed being installed on a floor and having an upper surface including small steps in a region in which said movable unit is horizontally movable, said region in which said movable unit is horizontally movable being a rectangular region defined by a range perpendicular to a horizontal direction and a range in the horizontal direction, said bed including a portion in said region in which said movable unit is horizontally movable, said portion being held at a predetermined height from said floor and another portion in front of said portion in said region in which said movable unit is horizontally movable, said other portion having a predetermined height from said floor, said coolant tank and/or said chip conveyor being housed in a front lower area of said other portion.

10. A machine tool according to claim 6, further comprising:
a main slide body held in sliding engagement with said main guide rail, said main slide body and said main guide rail jointing providing a main linear guide; and
an auxiliary slide body held in sliding engagement with said auxiliary guide rail, said auxiliary slide body and said auxiliary guide rail jointing providing an auxiliary linear guide;
wherein said main linear guide and said auxiliary linear guide hold said second headstock in vertical directions and directions perpendicular to said vertical directions for preventing said second headstock from being lifted and swinging laterally, so that said second headstock is horizontally movable while being supported and guided by said main linear guide and said auxiliary linear guide.

* * * * *

UNITED STATES PATENT AND TRADEMARK OFFICE
CERTIFICATE OF CORRECTION

PATENT NO. : 7,987,567 B2  
APPLICATION NO. : 12/265138  
DATED : August 2, 2011  
INVENTOR(S) : Hiroshi Yasuda et al.

Page 1 of 1

It is certified that error appears in the above-identified patent and that said Letters Patent is hereby corrected as shown below:

On the Title Page:

Item (73) Assignee should read:  MORI SEIKI CO., LTD., Yamatokoriyama-ski (JP)

Signed and Sealed this
Eleventh Day of October, 2011

David J. Kappos
*Director of the United States Patent and Trademark Office*